(12) United States Patent
Martin et al.

(10) Patent No.: US 8,523,553 B2
(45) Date of Patent: Sep. 3, 2013

(54) APPARATUS FOR FORMING HAT STIFFENED COMPOSITE PARTS USING THERMALLY EXPANSIVE TOOLING CAULS

(75) Inventors: Jeffrey D. Martin, O'Fallon, MO (US); Keith Rupel, Chesterfield, MO (US); Philip O. Chrissos, Maryland Heights, MO (US); Neal A. Froeschner, Florissant, MO (US); Ronald J. Byington, O'Fallon, MO (US); Karen M. Jost, St. Louis, MO (US); Jimmy S. Piszar, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 300 days.

(21) Appl. No.: 12/905,770

(22) Filed: Oct. 15, 2010

(65) Prior Publication Data
US 2011/0024052 A1 Feb. 3, 2011

Related U.S. Application Data

(62) Division of application No. 11/561,602, filed on Nov. 20, 2006, now Pat. No. 7,854,874.

(51) Int. Cl.
*B29C 70/00* (2006.01)
*B29C 70/24* (2006.01)

(52) U.S. Cl.
USPC ............ 425/195; 425/383; 425/403; 249/184

(58) Field of Classification Search
USPC ............. 425/195, 383, 387.1, 388, 389, 403; 249/184
See application file for complete search history.

(56) References Cited

U.S. PATENT DOCUMENTS

| | | | |
|---|---|---|---|
| 3,745,204 A * | 7/1973 | Telbizoff | 264/257 |
| 3,995,081 A | 11/1976 | Fant et al. | |
| 4,683,099 A | 7/1987 | Buxton et al. | |
| 4,822,436 A | 4/1989 | Callis et al. | |
| 4,836,765 A | 6/1989 | Kornitzky et al. | |
| 5,002,476 A | 3/1991 | Kerr | |
| 5,071,338 A | 12/1991 | Dublinski et al. | |
| 5,242,523 A | 9/1993 | Willden et al. | |
| 5,527,414 A | 6/1996 | Dublinski et al. | |
| 5,688,353 A | 11/1997 | Dublinski et al. | |
| 5,817,269 A | 10/1998 | Younie et al. | |
| 6,217,000 B1 * | 4/2001 | Younie et al. | 249/184 |

FOREIGN PATENT DOCUMENTS

EP 1238785 A 9/2002

* cited by examiner

*Primary Examiner* — Richard Crispino
*Assistant Examiner* — Thukhanh Nguyen
(74) *Attorney, Agent, or Firm* — Yee & Associates, P.C.

(57) ABSTRACT

An apparatus and methods for forming a composite part are provided. A method for forming a composite part may include placing initial composite material on a base tool, placing a tooling mandrel on the composite material, placing additional composite material over the tooling mandrel, covering at least a portion of the composite material that overlays the tooling mandrel with a composite forming tool, heating the composite material to at least partially cure the composite material, and permitting a first portion of the composite forming tool to change size during the heating of the composite material to a greater degree than a second portion of the composite forming tool. In this regard, the second portion of the composite forming tool is closer to the base tool than the first portion of the composite forming tool. A composite forming tool is provided that permits differential expansion of different portions of the tool.

15 Claims, 2 Drawing Sheets

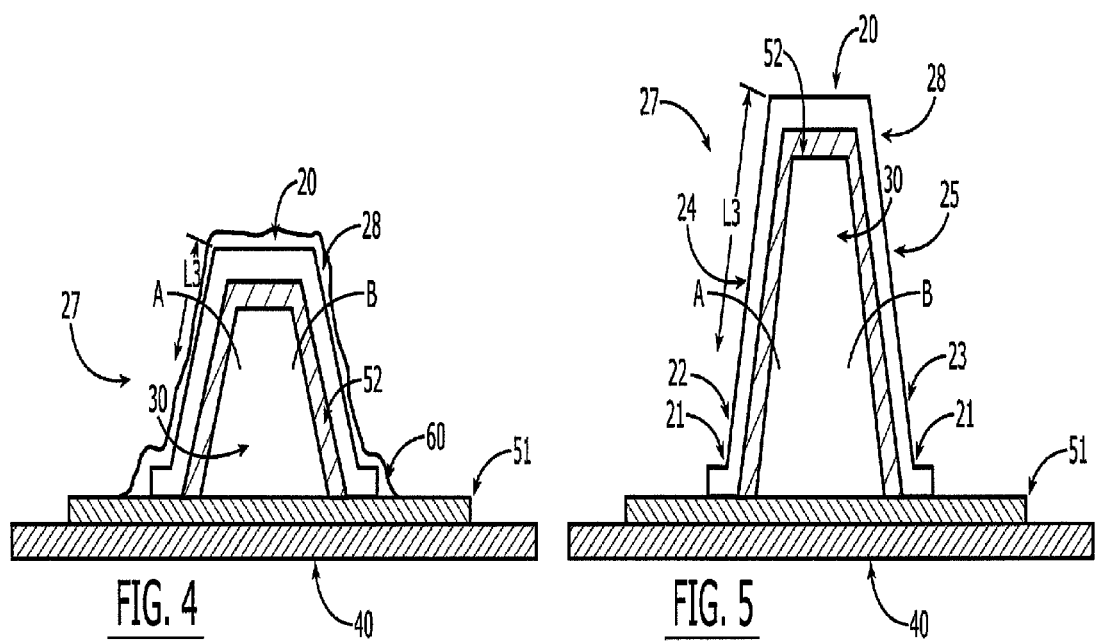

APPARATUS FOR FORMING HAT STIFFENED COMPOSITE PARTS USING THERMALLY EXPANSIVE TOOLING CAULS

CROSS-REFERENCE TO RELATED APPLICATIONS

This application is a divisional of and claims priority to U.S. application Ser. No. 11/561,602 filed on Nov. 20, 2006, now U.S. Pat. No. 7,854,874, issued Dec. 21,2010, the entire contents of which is expressly incorporated herein by reference.

BACKGROUND INFORMATION

1. Field:

Embodiments of the disclosure relate to the formation of a composite part and, more particularly, to apparatus and methods for forming hat stiffened composite parts using stretchable tooling cauls.

2. Background:

Composite structures, such as those utilized in the aircraft and other industries, are commonly formed by curing a polymeric composite material while the material is covered, at least partially, and supported by forming tools. One common composite structure employed in aerospace and other applications is a hat stiffened composite part. To construct a hat stiffened composite part, the fabrication process begins by placing composite material on a base tool, placing a tooling mandrel on the composite material supported by the base tool, placing additional composite material over one tooling mandrel, and covering at least part of the composite material with a forming tool. The forming tool usually covers at least the composite material that overlays the tooling mandrel and helps define the hat shape. The composite material may then be subjected to a curing process, such as debulking and heating, to further adhere and bond the composite layers in order to produce an integral composite structure.

The increased accuracy required for critical dimensions of parts has created a need for tools that can form composite parts with high degrees of accuracy, at least for the critical dimensions. With respect to hat stiffened composite parts, for example, the radius defined at the intersection between the hat stiffener legs and the corresponding planar structure must typically be maintained to within a very tight tolerance. Conventional rigid forming tools have provided limited capabilities to produce composite parts within the required accuracy. Namely, during the curing process, the tooling mandrel expands while the less thermally expansive composite forming tool, which covers at least a portion of the composite material, expands to a lesser degree, resulting in high and low pressure areas within the composite material that cause part porosity or unwanted composite material movement. As such, composite material may be scrapped in failed attempts to produce parts having the critical dimensions using an almost non-expansive forming tool. In addition, the difference in expansion between the tooling mandrel and the less thermally expansive forming tool may also impair the bonding process of the composite material so that the resulting part exhibits flaws, such as disbonds.

More thermally expansive forming tools have been developed that are capable of more expansion than less thermally expansive tools. However, both nearly non-expansive and more thermally expansive forming tools fail to consistently produce parts that meet the critical dimensional requirements. For instance, a hat stiffened composite part generally requires a specific corner radius at the intersection of the hat stiffener legs and the corresponding planar structure. This is often a critical dimension for a hat stiffened composite part. Generally, a thermally expansive tooling mandrel may be used to form the inside of the hat structure, while a less thermally expansive forming tool may be used to form the outside of the hat structure. Often, the thermally expansive tooling mandrel expands during the curing process, while the less thermally expansive forming tool does not expand nearly as much. The problem with this difference in expansion is that the corner radius of the finished part is out of tolerance.

It would therefore be advantageous to provide apparatus and methods for forming a composite part, such as a hat stiffened composite, with increased accuracy of formation and quality. In addition, it would be advantageous to provide apparatus and methods to decrease the amount of composite material scrapped because of poor part formation techniques and tools.

SUMMARY

Embodiments of the disclosure may address the above needs and achieve other advantages by providing improved apparatus and methods for the formation of a composite part, such as a hat stiffened composite part. Generally, embodiments of the disclosure provide apparatus and methods for forming a composite part with greater flexibility, thereby reducing the amount and severity of any flaws. For example, composite parts may be formed by using a stretchable tooling caul and stretchable tooling mandrel.

In one embodiment, a tool for forming a composite part is provided. The tool includes first and second leg portions and third and fourth leg portions that are connected to the first and second leg portions, respectively. The tool further includes an interconnect portion that extends between and connects the third and fourth leg portions. The first and third leg portions and the second and fourth leg portions may define respective planar surfaces. The first and second leg portions may include respective foot portions. The foot portions of the first and second leg portions may be parallel with the interconnect portion. In order to advantageously provide for differential expansion between leg portions, the first and second leg portions of the composite forming tool include a material that is less thermally expansive than a material that forms the third and fourth leg portions and the interconnect portion. For example, the first and second leg portions and respective foot portions may be formed of fluoroelastomer and the third and fourth leg portions and the interconnect portion may include silicone rubber. Additionally, the first and second leg portions may include fluoroelastomer with fiber reinforcement.

In another embodiment, a method of forming a composite part is provided. The method includes placing initial composite material on a base tool and placing a tooling mandrel on the composite material. The method further includes placing additional composite material over the tooling mandrel and covering at least a portion of the composite material that overlays the tooling mandrel with a composite forming tool. Also, the method includes heating the composite material, such as by applying radiant heat to the composite part, to at least partially cure the composite material. The method may include permitting the tooling mandrel to also expand during the heating of the composite material. In this regard, a first portion of the composite forming tool may be permitted to change size, such as by expanding more greatly, during the heating of the composite material to a greater degree than a second portion of the composite forming tool, wherein the second portion of the composite forming tool is closer to the base tool than the first portion of the composite forming tool.

In another embodiment, an apparatus for composite forming is provided. The apparatus includes a base tool and a tooling mandrel upon the base tool. The tooling mandrel may include opposed first and second surfaces, wherein the first surface has a smaller radius than the radius of the second surface. The apparatus also includes a composite forming tool that overlays the tooling mandrel and has a first and second leg portions with respective foot portions, third and fourth leg portions connected to the first and second leg portions, respectively, and an interconnect portion extending between and connecting the third and fourth leg portions. The foot portions of the first and second leg portions may be parallel with the interconnect portion. The first and third leg portions and the second and fourth leg portions may define respective planar surfaces. The first and second leg portions with respective foot portions may be formed of fluoroelastomer. Also, the first and second leg portions may be formed of fluoroelastomer with fiber reinforcement. The third and fourth leg portions, the interconnect portion, and the tooling mandrel may be formed of silicone rubber.

BRIEF DESCRIPTION OF THE DRAWINGS

Figure 1:
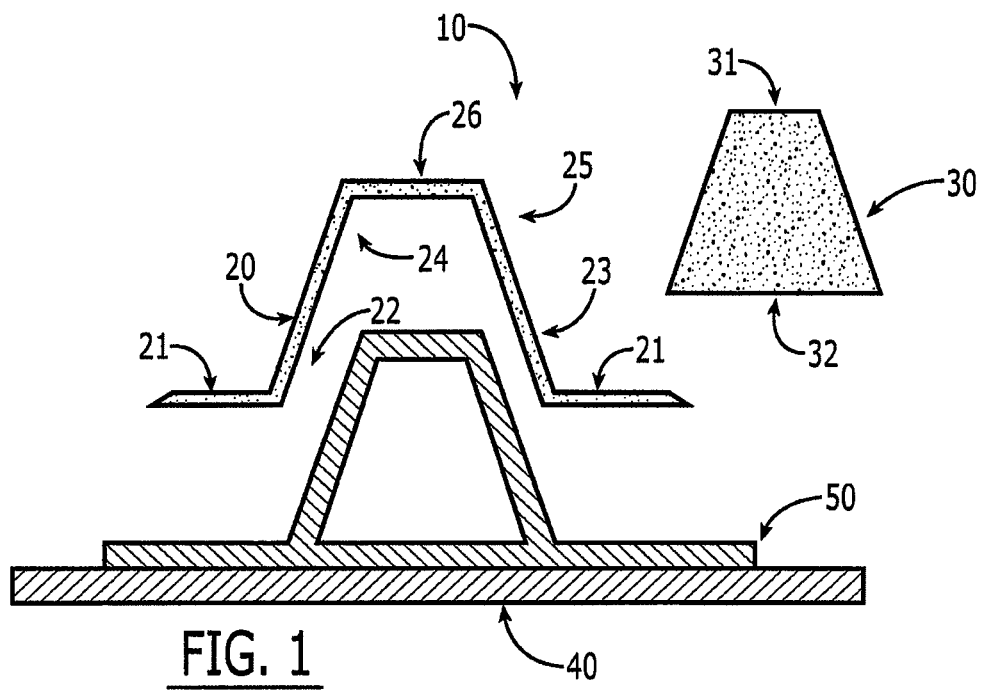

Having thus described the embodiments of the disclosure in general terms, reference will now be made to the accompanying illustrations, which are not necessarily drawn to scale, and wherein:

FIG. 1 is a section illustration of the composite forming apparatus with a composite part according to one embodiment.

Figure 2:
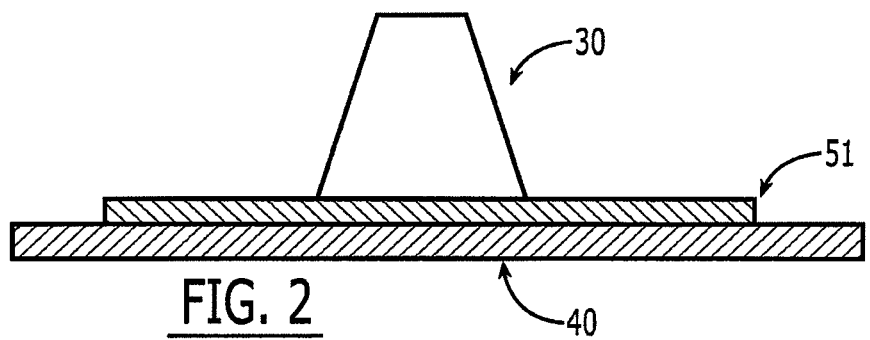

FIG. 2 is a section illustration of the tooling mandrel upon composite material with the composite material lying on the base tool according to another embodiment.

Figure 3:
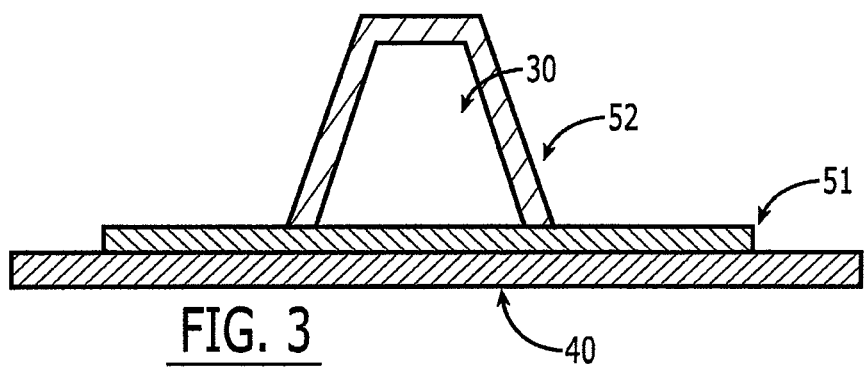

FIG. 3 is a section illustration of the tooling mandrel with additional composite material placed on it while the tooling mandrel lies on composite material according to yet another embodiment.

FIG. 4 is a section illustration of the composite forming tool covering the additional composite material according to still another embodiment.

FIG. 5 is a section illustration of the first portion of the composite forming tool changing size to a greater degree than a second portion of the composite forming tool according to again another embodiment.

DETAILED DESCRIPTION

The embodiments will now be described more fully hereinafter with reference to the accompanying illustration, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, there is shown a composite forming apparatus 10. Although the embodiment of the composite forming apparatus 10 depicted in FIG. 1 and described below is configured to form a hat stiffened composite part 50, such as a hat stiffened composite beam, the composite forming apparatus 10 and the associated forming method may be configured to form other types of composite structures. While hat stiffened and other types of composite parts are commonly employed in aerospace applications, the resulting composite parts may be employed in other applications and other industries if so desired.

In FIG. 1, the forming apparatus 10 includes a composite forming tool 20, a tooling mandrel 30, and a base bond tool 40. Base bond tool 40 is typically designed to support the composite structure during forming operations and, in some instances, may define at least a portion of the resulting shape of the composite structure. As such, the base band tool 40 generally has a planar shape but could be otherwise depending upon the shape of the resulting composite part. The base bond tool 40 is typically made of steel, carbon or glass epoxy, or other metallic or non-metallic materials.

The tooling mandrel 30 is generally designed to define an interior space or void within the resulting composite structure and, as such, may have various shapes and sizes depending upon the size and shape of the resulting composite part. In the illustrated embodiment, a tooling mandrel 30 is shown to be a trapezoid with a first surface 31 having a smaller cross sectional width than the width of an opposed second surface 32. The tooling mandrel 30 may be made of various materials, such as silicone rubber.

Composite forming tool 20 generally has a shape that complements the tooling mandrel 30 which, in turn, is driven by the shape and size of the resulting composite part. However, the shape of the composite forming tool 20 may differ from the tooling mandrel 30 if dictated by the shape and size of the resulting composite part. The composite forming tool's 20 shape may include tapered portions, thickness differences between one portion and another, and other features to assist in producing the required part. In FIG. 1, composite forming tool 20 includes foot portions 21, first leg portion 22 and second leg portion 23, third leg portion 24 and fourth leg portion 25, and interconnect portion 26. In this embodiment, first and third leg portions 22,24 comprise a first leg 27 and second and fourth leg portions 23,25 comprise a second leg 28. Each leg may be split equally to establish both leg portions or each leg portion may constitute different amounts of the overall leg so long as the first and second leg portions 22,23 are proximate the respective foot portions 21 and the third and fourth portions 24,25 are proximate the interconnect portion 26.

First and second leg portions 22,23 are less thermally expansive than third and fourth leg portions 24,25 because third and fourth leg portions 24,25 are formed of a material with a greater coefficient of thermal expansion than first and second leg portions 22,23. For example, the first and second leg portions 22,23 can be formed of fluoroelastomer, while the third and fourth leg portions 24,25 and the interconnect portion 26 can be formed of silicone rubber. The foot portions 21 are generally formed of the same material as the first and second leg portions 22,23, such as a fluoroelastomer. Also, the first and second leg portions 22,23 and respective foot portions 21 may include a layer of glass or carbon fiber reinforcement. Because of the difference in thermal expansion properties, third and fourth leg portions 24,25 expand and contract more than first and second leg portions 22,23 as the temperature changes, such as during curing of the composite part. Consequently, the composite forming tool 20 and tooling mandrel 30 permit curvature change while still controlling the critical shape of the radius defined at the intersection between the legs of the composite part and the corresponding planar structure. The first and second leg portions 22,23, as well as respective foot portions 21, may also contain extra thickness when compared with third and fourth leg portions 24,25 in order to provide greater control over part shape.

One advantageous method of forming a composite part begins in FIG. 2, which shows the tooling mandrel 30 placed upon composite material 51 that lies on base bond tool 40. The composite material 51 may be one or more plies or sheets of prepreg material, such as a matrix of graphite fibers in cloth or tape form preimpregnated with a conventional resin laid up with a 0, 45, 90 orientation, 0, 30, 60, 90 orientation, or other suitable orientation. After the tooling mandrel 30 is placed on the composite material 51, additional composite material 52 is placed over the tooling mandrel 30 as shown in FIG. 3. As before, the additional composite material 52 may be one or more plies, such as wrap and tube plies, or sheets of composite material, such as prepeg material. The additional composite material 52 may be formed of the same or a different composite material as that of the composite material 51. Also, additional composite material 52 may have the same or a different fiber orientation as that of composite material 51.

The next step in forming a composite part, as seen in FIG. 4 may be placing the composite forming tool 20 so as to cover at least a portion of additional composite material 52. Vacuum bag 60 may be placed over composite forming tool 20 and composite material 51 in order to vacuum bag composite forming tool 20, tooling mandrel 30, composite material 51, and additional composite material 52 to the base bond tool 40. Generally, a curing process takes place after the composite forming tool 20 is placed on top of additional composite material 52 and is generally held in place, such as by means of evacuating a vacuum bag 60 or the like. A curing process can include the application of heat, such as by means of radiating heat and, optionally, the application of compressive or evacuated pressure force to the composite material.

As a result of the first and second leg portions 22,23 being formed of a less thermally expansive material with a lower coefficient of thermal expansion than that of the third and fourth leg portions 24,25, the first and second leg portions 22,23 hold their shape and position more than do the third and fourth leg portions 24,25 during the heating process since the third and fourth leg portions 24,25 expand to a greater degree than do the first and second leg portions 22,23. Although not drawn to scale, FIG. 5 shows third and fourth leg portions 24,25 of the composite forming tool 20 changing size during the heating of the composite materials 52,51 to a greater degree than first and second leg portions 22,23 of the composite forming tool 20. Also in FIG. 5, tooling mandrel 30 expands during the heating of the composite material, typically to a greater degree than the first and second leg portions 22,23 but in an amount less than or equal to the expansion of the third and fourth leg portions 24,25. The relative change in size of composite forming tool 20 as seen when comparing FIG. 4 to FIG. 5 is not generally the typical magnitude of expansion, but has been exaggerated for purposes of illustration. Also, the line A between the first and third leg portions 22,24 and the line B between the second and fourth leg portions 23,25 are for illustration purposes only and are not generally visible. Both lines A, B help to show how the third and fourth leg portions 24,25 expand more than the first and second leg portions 22,23. For instance, the line A in FIG. 4 roughly divides the unheated first leg 27 into 2 equal portions, first and third leg portions 22,24. As such, FIG. 4 shows that the length of the first leg portion 22, length L1, is roughly the same as the length of the third leg portion 24, length L3. The curing process, which takes place in FIG. 5, causes the third leg portion 24 to expand to a greater degree than that of the first leg portion 22 because, as previously discussed, of the difference in the coefficient of thermal expansion of the materials that make up the separate leg portions. By comparing FIG. 5 to FIG. 4, the length L3 of the third leg portion 24 is shown to increase during the curing process, while the length L1 of the first leg portion 22 is not shown to increase as much as length L3. In addition, FIG. 5 shows that line A no longer divides first leg 27 into roughly two equal portions, but, instead, the third leg portion 24 now forms more than half of the overall leg as a result of third leg portion 24 expanding to a greater degree than first leg portion 22. The second and fourth leg portions 23,25, which form the second leg 28, also expand in lesser and greater amounts, respectively, during the curing process in the same manner as discussed above in connection with the first leg 27.

After the curing process, the composite forming apparatus 10 and composite material 51,52 are cooled and the composite forming tool 20 and tooling mandrel 30 are thereafter removed. Both the composite forming tool 20 and the tooling mandrel 30 may be reused for the production of multiple composite parts. Then, the composite part, such as a hat stiffened composite part 50, is removed from the base bond tool 40. After cooling down, the composite may retain the shape it had during curing because of the resin curing and solidifying. In other embodiments, different types of composite parts may be formed.

By forming the first and second leg portions 22,23 with material that does not expand to as great a degree as the other portions of the leg, a corner shape can be constrained or held within tolerances during fabrication, which is desirable with respect to the integrity of composite parts. As such, the corners defined between the foot portions 21 and the first and second leg portions 22,23 can be formed to a more exacting tolerance than other portions of the composite part, such as the corners between the third and fourth leg portions 24,25 and the interconnecting portion 26. Since the corners defined between the foot portions 21 and the first and second leg portions 22,23 must be held to a closer tolerance than other portions of the composite part, the composite forming tool 20 is configured to form composite parts that meet even quite exacting tolerances for some of the features while still permitting the inevitable expansion of the composite material and the tooling mandrel 30 which occurs during the curing process.

Many modifications and other embodiments of the inventions set forth herein will come to mind to one skilled in the art to which these inventions pertain having the benefit of the teachings presented in the foregoing descriptions and the associated drawings. For example, the composite forming apparatus 10 may have other shapes and/or other portions of the composite forming tool 20 may be formed of less thermally expansive material. Generally, however, the composite forming tool 20 will include less thermally expansive material with a lower coefficient of thermal expansion proximate those features of the composite part that have smaller tolerances and more thermally expansive material with a greater coefficient of thermal expansion proximate those other features of the composite part that have looser tolerances, with the expansion of the composite material 51,52 and/or the tooling mandrel 30 predominately accommodated by the expansion of those portions of the composite forming tool 20 formed of the more thermally expansive material. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A composite forming tool comprising:
   a single body, the body comprising:
   first and second leg portions;
   third and fourth leg portions, connected to the first and second leg portions, respectively; and an interconnect portion extending between and connecting the third and fourth leg portions, wherein the first and second leg portions of the composite forming tool comprise a material that is less thermally expansive than a material that forms the third and fourth leg portions and the interconnect portion.

2. A composite forming tool according to claim 1 wherein the first and second leg portions further comprise respective foot portions.

3. A composite forming tool according to claim 1 wherein the first and second leg portions comprise fluoroelastomer.

4. A composite forming tool according to claim 1 wherein the third and fourth leg portions and the interconnect portion comprise silicone rubber.

5. A composite forming tool according to claim 2 wherein the foot portions of the first and second leg portions are parallel with the interconnect portion.

6. A composite forming tool according to claim 1 wherein the first and third leg portions and the second and fourth leg portions define respective planar surfaces.

7. A composite forming tool according to claim 1 wherein the first and second leg portions comprise fluoroelastomer with fiber reinforcement.

8. A composite forming apparatus comprising:
a base tool;
a tooling mandrel upon the base tool; and
a composite forming tool comprising a single body that overlays the tooling mandrel;
wherein the body of the composite forming tool comprises first and second leg portions with respective foot portions, third and fourth leg portions, connected to the first and second leg portions, respectively, and an interconnect portion extending between and connecting the third and fourth leg portions, wherein the first and second leg portions of the composite forming tool comprise a material that is less thermally expansive than a material that forms the third and forth leg portions and the interconnect portion.

9. A composite forming apparatus according to claim 8 wherein the first and second leg portions with respective foot portions of the composite forming tool comprise fluoroelastomer.

10. A composite forming apparatus according to claim 8 wherein the third and fourth leg portions and the interconnect portion of the composite forming tool comprise silicone rubber.

11. A composite forming apparatus according to claim 8 wherein the foot portions of the first and second leg portions of the composite forming tool are parallel with the interconnect portion.

12. A composite forming apparatus according to claim 8 wherein the first and third leg portions and the second and fourth leg portions define respective planar surfaces.

13. A composite forming apparatus according to claim 8 wherein the first and second leg portions comprise fluoroelastomer with fiber reinforcement.

14. A composite forming apparatus according to claim 8 wherein the tooling mandrel comprises silicone rubber.

15. A composite forming apparatus according to claim 8 wherein the tooling mandrel comprises a top surface and bottom surface, wherein the top surface has a smaller radius than the radius of the bottom surface.

* * * * *